Dec. 29, 1953   A. L. KOHL ET AL   2,664,345
MANUFACTURE OF SULFUR FROM H₂S-HYDROCARBON CONTAINING GASES
Filed Aug. 27, 1949                                              2 Sheets-Sheet 1
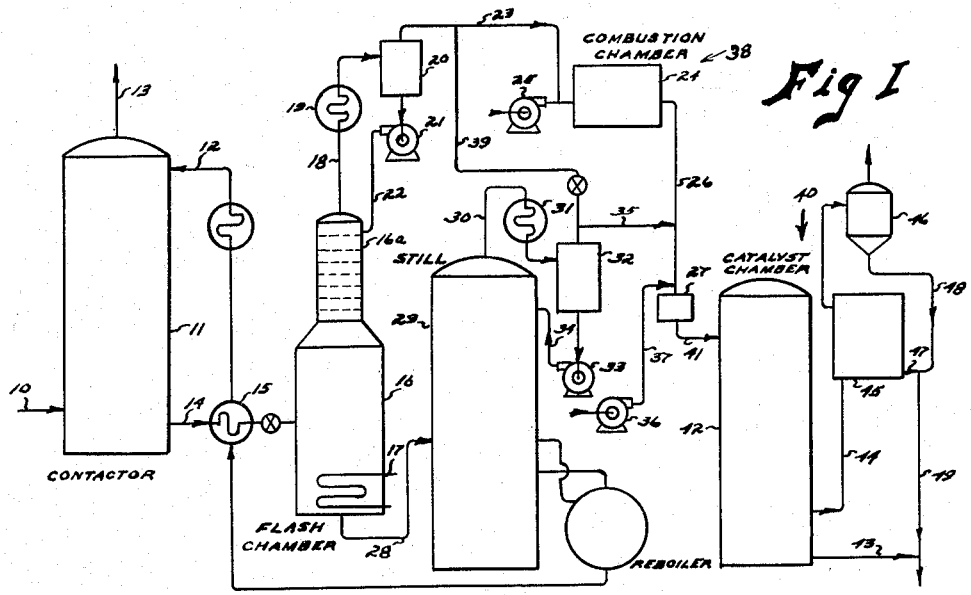
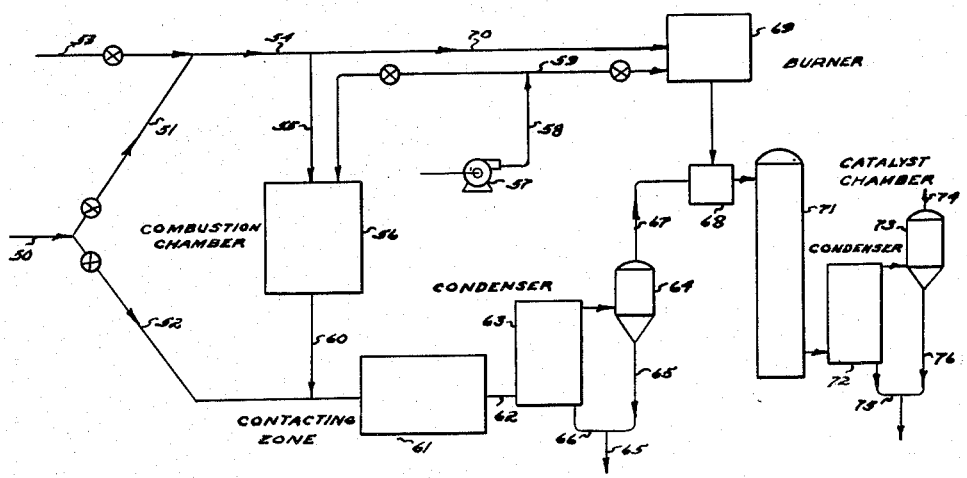
ARTHUR L. KOHL
CLYDE L. BLOHM
    INVENTORS
BY  *H. Calvin White*
      ATTORNEY

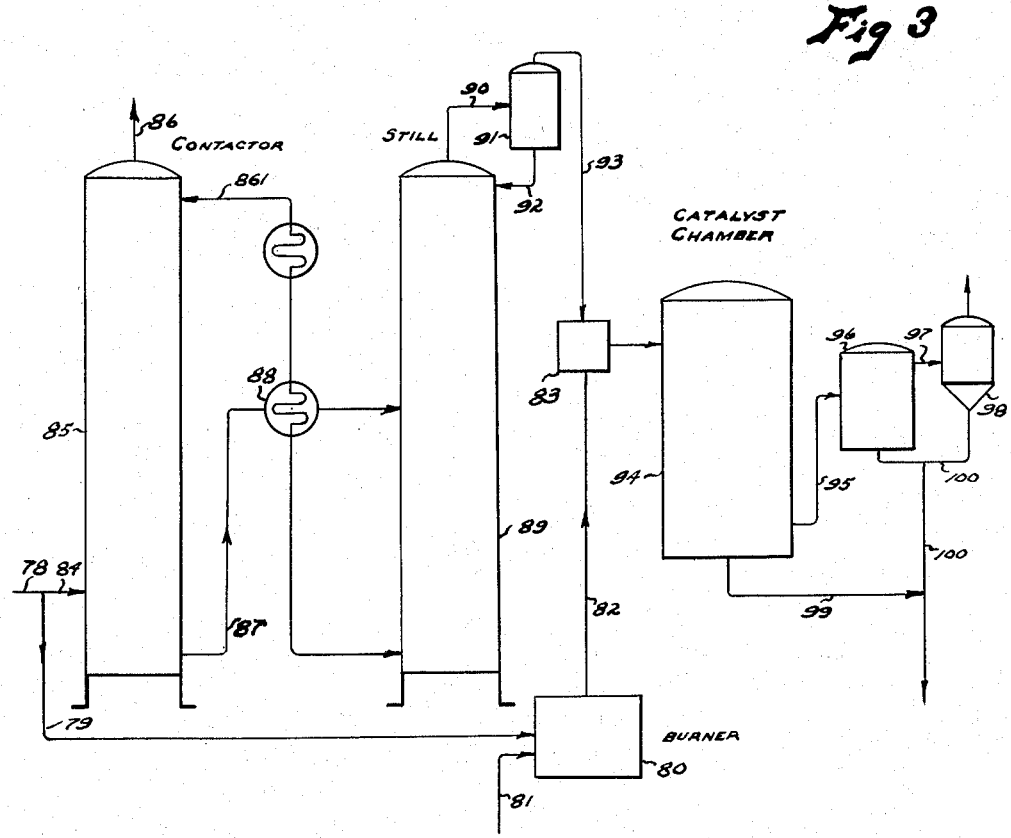

Patented Dec. 29, 1953

2,664,345

UNITED STATES PATENT OFFICE 2,664,345

MANUFACTURE OF SULFUR FROM H₂S-HYDROCARBON CONTAINING GASES

Arthur L. Kohl and Clyde L. Blohm, Los Angeles, Calif., assignors to The Fluor Corporation, Ltd., Los Angeles, Calif., a corporation of California Application August 27, 1949, Serial No. 112,696

1 Claim. (Cl. 23—225)

This invention has to do generally with the processing of gases containing hydrogen sulfide, produced for example as a plant by-product, for the purpose of so converting the hydrogen sulfide as to render its sulfur content recoverable in whatever form or chemical state desired. Thus, in a broad aspect, the invention may be regarded as being directed to the preconversion of hydrogen sulfide in a gaseous mixture to condition the resulting mixture for further treatment for recovery of sulfur or sulfur compounds, as may be determined in accordance with the objectives of any particular process.

Typically, the invention will be described as applied to the preconditioning of gaseous mixtures for conversion of their hydrogen sulfide content to elemental sulfur, and to the recovery of sulfur by processes having various novel and advantageous relations to the antecedent hydrogen sulfide conversions. Also the invention will be given typical adaptation as applied to the conversion of hydrogen sulfide-containing gases produced in the treatment of natural or refinery gases by use of the well-known amine or glycol amine solutions from which are released absorbed hydrogen sulfide and carbon dioxide.

When hydrogen sulfide is absorbed from an impure hydrocarbon gas by an agent capable of liberating it as hydrogen sulfide upon the application of heat, some quantity of hydrocarbon is also absorbed and subsequently liberated with the hydrogen sulfide. The quantity of hydrocarbon so absorbed will depend upon the nature of the absorbent and on the operating conditions. If an attempt is then made to convert the liberated hydrogen sulfide rich stream, as for example to sulfur by conventional means involving the well-known Claus process or modifications thereof, considerable difficulty is encountered due to the deposition of carbon on the catalyst and the occurrence of undesirable side reactions involving the hydrocarbons. An object of the present invention is to eliminate the above described difficulties and provide additional benefits which are described below.

In general, the method of the present invention employs the steps of:

a. Passing gas containing hydrogen sulfide in two gas streams, the first of which contains an appreciable quantity of hydrocarbon and is consequently more readily combustible.

b. Burning the first stream with air or oxygen so that essentially all of the hydrocarbons and at least a major portion of the hydrogen sulfides are oxidized substantially completely (that is, to carbon dioxide, sulfur dioxide and water).

c. Adding the combustion products of this stream to the remaining hydrogen sulfide-containing stream, and where the purpose of the process is to produce elemental sulfur, reacting the hydrogen sulfide, sulfur dioxide and oxygen present in the mixed gas for the formation of elemental sulfur by conventional means which may, for example, involve utilization of a bauxite catalyst, a cooler for condensing sulfur and a separator for removing sulfur from the gas stream.

In treating hydrocarbon gas streams for the removal of hydrogen sulfide, as for example by a solution of monoethanolamine in diethylene glycol and water as described in U. S. Patent No. 2,177,068, it is customary to operate so that essentially all or most of the carbon dioxide is removed with the hydrogen sulfide. In certain cases the quantity of carbon dioxide considerably exceeds the quantity of hydrogen sulfide in the gas so that the total acid gas stream normally evolved from the solution will not support combustion. However, in the application of the present method in which all of the hydrocarbon gas absorbed by the solution is concentrated in a single small gas stream, a readily combustible mixture is usually obtained. It may also occur that the hydrocarbon containing portion contains the acid gases in a higher ratio of hydrogen sulfide to carbon dioxide than does the main stream by reason of the higher volatility of hydrogen sulfide than carbon dioxide from such solutions. This factor also has the effect of rendering the side stream more readily combustible. In certain cases, however, where there is an extremely large quantity of carbon dioxide in the mixture as compared to hydrogen sulfide and hydrocarbons, the hydrocarbon containing side stream is still not readily combustible. In such cases this stream may be preheated prior to combustion before or after the addition of air so that the reactions of hydrocarbon and hydrogen sulfide with oxygen need only supply the additional heat necessary to maintain the necessary high temperature. In such instances the present invention has the advantage of preventing undesirable side reactions and carbon deposition in a catalytic stage and furthermore makes it unnecessary to preheat the entire acid gas stream. In other instances as where a hydrogen sulfide stream is diluted with a large quantity of carbon dioxide, the application of the present invention may consist of splitting the stream into two portions, adding hydrocarbon gases to one of the portions (which may contain approximately one-third of the total hydrogen sulfide), burning this portion completely, adding it to the remaining portion, and reacting the mixture for the production of sulfur by known means.

Further features and objects of the invention, as well as the details of certain illustrative embodiments will be understood more fully from the following description of the accompanying drawing showing such embodiments in flow sheet form. In the drawing:

Fig. 1 is a general view showing in flow sheet form one embodiment of the invention;

Fig. 2 is a view of like nature illustrating the variational embodiment; and

Fig. 3 is a showing of a further variational form.

Referring first to the system illustrated in Fig. 1, it may be assumed that the gaseous stream containing hydrocarbons and also hydrogen sulfide, carbon dioxide and moisture, is fed through line 10 into contactor 11 in which the gas is treated by intimate contact with a solution of monoethanolamine, diethylene glycol and water introduced to the column through line 12 so that the gas rises in intimate contact with the down-flowing solution. Typically the contactor may be operated at a pressure of around 600 pounds per square inch. The treated gas leaves the contactor through line 13. The rich solution containing absorbed hydrogen sulfide, carbon dioxide, hydrocarbons and some moisture, flows from the contactor through line 14 and exchanger 15 into a flash chamber 16 which may be maintained at a pressure considerably below the contactor pressure, for example in the neighborhood of 20 pounds per square inch, and at a moderately elevated temperature acquired in the heat exchanger 15, or by the bottom heating coil 17, so that essentially all of the hydrocarbons and some of the acid gases are flashed from the treating solution and discharged overhead through line 18.

The overhead gas stream is discharged through a cooler 19 into a condensate accumulator 20 from which the condensate may be returned by pump 21 through line 22 as reflux to the top section 16a of the flash chamber. From accumulator 20 the uncondensed gases pass through line 23 to a combustion chamber 24 into which air is introduced by blower 25 in the correct proportion for complete combustion of the gases. As will be understood, the combustion chamber 24 may be a boiler fire box or other appropriate equipment. The combustion gases leaving chamber 24 pass through line 26 to the mixing chamber 27.

After being separated in flash chamber 16 from essentially all of the previously dissolved hydrocarbons and a portion of the acid gases, the rich solution flows through line 28 to the still 29 which may be operated under temperature and pressure conditions usually employed in amine treating solution stills to drive off the absorbed acid gases. The latter pass overhead from the still through line 30 and cooler 31 to the condensate accumulator 32, from which condensate is returned by pump 33 through line 34 as reflux to the still. The uncondensed gases flow through line 35 to be combined and mixed in chamber 27 with the gaseous stream entering through line 26. If the stream in line 26 contains insufficient sulfur dioxide and oxygen to oxidize to sulfur all of the hydrogen sulfide contained in the combined streams, additional air may be added at the mixing stage, as by blower 36 discharging through line 37. If desired, a portion of the gases flowing through line 35 may be by-passed through the combustion stage generally indicated at 38, as by way of line 39 connecting with line 23.

The gaseous mixture leaving chamber 27 and containing hydrogen sulfide, sulfur dioxide and other gases, in the broad contemplation of the invention may be given any particular or desired further treatment for the recovery or conversion of constituents of the gaseous mixture. Typically and as a subsequent treatment having as will be understood a particularly advantageous relation to the described antecedent treatments given the starting gaseous mixture, the gas leaving chamber 27 is treated for the production of elemental sulfur. Since any of various known specific processes may be used for the recovery of elemental sulfur from gaseous mixtures of the nature or composition formed at chamber 27, it will suffice to refer generally to the sulfur production stage, generally indicated at 40, as illustrative of the well-known Claus type process and its various recognized modifications.

The gaseous mixture leaving chamber 27 is discharged through line 41 into chamber 42 containing an appropriate catalyst such as bauxite, wherein elemental sulfur is precipitated out of the gas stream and recovered as a molten stream drawn off from the catalyst chamber through line 43. The gases leaping the catalyst chamber through line 44 pass through the sulfur condenser 45 and separator 46. Liquid sulfur is removed from the condenser and separator through lines 47 and 48 connecting through line 49 with the catalyst chamber draw-off line 43.

The variational form of the invention illustrated in Fig. 2 illustrates an embodiment of the invention particularly adapted for the recovery of sulfur from the hydrogen sulfide occurring in a feed gas stream containing a considerable quantity of carbon dioxide or other inert gas. The gas fed to the system through line 50 is split into two streams in lines 51 and 52 proportioned so that the stream in 51 carries approximately one-third of the hydrogen sulfide concentration of the feed gas. Liquid or gaseous hydrocarbons are admitted through line 53 to the gas stream in line 51 in sufficient quantity to form a readily combustible mixture in line 54, and a major portion of this stream is passed through line 55 to be burned with added air in combustion chamber 56. Air in proper proportion to support the combustion is supplied by blower 57 through lines 58 and 59. The hot combustion products are discharged through line 60 to be mixed with the split portion of the feed gas stream conducted through line 52, and the mixture is passed through a contacting chamber 61 which may or may not contain a catalyst. The vapors from the contacting zone are discharged through line 62 and thence through condenser 63 and separator 64 wherein condensed sulfur droplets are formed and drawn off through line 65. Sulfur condensate forming in chamber 63 is withdrawn through line 66.

The non-condensed gases leaving separator 64 are passed through line 67 to a mixing chamber 68 wherein they are mixed with the hot combustion products from a burner 69 fed by a side stream of gases taken from line 54 through line 70, and air supplied through line 59. Combustion of a side stream (in line 70) of that portion of the feed gas stream split into line 51, thus serves to increase the temperature of the gaseous mixture formed in chamber 68. The gases thence are discharged through the catalyst chamber 71. The presence of the combustion gases in the mixture flowing through the catalyst chamber serves to decrease the partial pressure of the sulfur vapor, thus increasing the speed of conversion of sulfur dioxide to elemental sulfur and prevent the condensation of an excessive quantity of liquid sulfur upon the catalyst. The gases leaving chamber 71 pass through condenser 72 and separator 73 to the vent line 74. Liquid sulfur is recovered from the condenser and separator through lines 75 and 76.

Fig. 3 illustrates a further variational process embodying the invention in which a gaseous stream containing hydrogen sulfide and hydrocarbon is divided into two portions, one and preferably a smaller portion being burned with air, the second portion treated to produce a substantially pure or high concentration hydrogen sulfide gas, and the latter then mixed with the combustion products of the first mentioned portion for further treatment, as the production of elemental sulfur.

Here a gaseous stream containing typically 50% hydrogen sulfide and 50% vaporized hydrocarbons is fed to the system through line 78, from which about one-third of the stream is taken through line 79 to a burner or furnace 80 in which the gas, admixed with air from line 81 is burned to produce a mixture composed essentially of carbon dioxide, sulfur dioxide and water. The combustion products are taken through line 82 to the mixing chamber 83.

The second and larger portion of the feed stream passes through line 84 into contactor 85 which is fed with an aqueous amine (e. g., monoethanolamine), solution introduced through line 86I. In the contactor, the gas stream from line 84 is treated under conditions such that all the hydrogen sulfide is absorbed in the treating solution, without absorbing any considerable quantity of the hydrocarbon gas, which leaves the contactor through the outlet 86. Such separation of the hydrocarbons and hydrogen sulfide may result from the use of a straight aqueous amine treating solution which does not tend to absorb hydrocarbons, or where a different treating solution used might tend at higher pressures to absorb any considerable quantities of hydrocarbons, the contactor may be operated at a pressure sufficiently low that the hydrocarbon gas will pass on through.

Leaving the contactor, the rich solution passes through line 87 and exchanger 88 to the still 89 within which the hydrogen sulfide is stripped from the treating solution and discharged through line 90, and condenser 91 from which the condensate is returned to the still as reflux through line 92. The hydrogen sulfide gas flows through line 93 into the mixing chamber 83 to be combined with the combustion products fed through line 82. The resulting mixture is subjected to conversion for the recovery of elemental sulfur as in the previously described process, and typically by passage through the catalyst chamber 94 and thence through line 95, condenser 96, and line 97 to the separator 98. As before, the elemental sulfur is recovered from the catalyst chamber through line 99 and from the condenser and separator through line 100.

We claim:

In the manufacture of sulfur from a supply of gases containing hydrogen sulfide and hydrocarbons, the method that includes dissolving said hydrogen sulfide and hydrocarbons in an absorbent liquid, passing the resulting solution into a still, separating a mixture of hydrogen sulfide and hydrocarbons from the absorbent in advance of its entry into the still, using gases containing hydrogen sulfide separated from the solution in the still in forming a first stream, using said mixture of hydrogen sulfide and hydrocarbons separated in advance of the still to form a second stream containing a concentration of hydrocarbon gases substantially in excess of any hydrocarbon concentration in the first stream and the first stream being less combustible than said second stream, adding oxygen to said second stream and converting its hydrogen sulfide and hydrocarbon content by combustion to products including carbon dioxide, sulfur dioxide and water, combining said combustion products with said first stream, and then maintaining the combined gases under conditions effecting conversion of the sulfur dioxide and hydrogen sulfide to elemental sulfur.

ARTHUR L. KOHL.
CLYDE L. BLOHM.

References Cited in the file of this patent

UNITED STATES PATENTS

| Number | Name | Date |
|---|---|---|
| 2,092,386 | Baehr | Sept. 7, 1937 |
| 2,169,379 | Barkholt | Aug. 15, 1939 |
| 2,177,068 | Hutchinson | Oct. 24, 1939 |
| 2,384,926 | Jones | Sept. 18, 1945 |
| 2,477,314 | Scharmann | July 26, 1949 |